(12) United States Patent
Kim et al.

(10) Patent No.: US 10,198,174 B2
(45) Date of Patent: Feb. 5, 2019

(54) ELECTRONIC DEVICE AND METHOD OF MANAGING MEMORY OF ELECTRONIC DEVICE

(71) Applicants: Samsung Electronics Co., Ltd., Gyeonggi-do (KR); Sungkyunkwan University Research & Business Foundation, Suwon-si, Gyeonggi-do (KR)

(72) Inventors: Jin-Soo Kim, Seoul (KR); Jinkyu Jeong, Suwon-si (KR)

(73) Assignees: Samsung Electronics Co., Ltd., Suwon-si (KR); Sungkyunkwan University Research & Business Foundation, Suwon-si (KR)

( * ) Notice: Subject to any disclaimer, the term of this patent is extended or adjusted under 35 U.S.C. 154(b) by 160 days.

(21) Appl. No.: 15/173,565

(22) Filed: Jun. 3, 2016

(65) Prior Publication Data

US 2016/0357473 A1     Dec. 8, 2016

(30) Foreign Application Priority Data

Jun. 5, 2015   (KR) ........................ 10-2015-0080217

(51) Int. Cl.
  *G06F 9/46*    (2006.01)
  *G06F 3/0488*  (2013.01)
  *G06F 3/0481*  (2013.01)
  *G06F 12/02*   (2006.01)

(52) U.S. Cl.
  CPC .......... *G06F 3/0488* (2013.01); *G06F 3/0481* (2013.01); *G06F 12/0223* (2013.01)

(58) Field of Classification Search
  CPC ... G06F 3/0488; G06F 12/0223; G06F 3/0481
  See application file for complete search history.

(56) References Cited

U.S. PATENT DOCUMENTS

| | | | | |
|---|---|---|---|---|
| 3,991,404 A | * | 11/1976 | Brioschi | G06F 9/268 712/248 |
| 5,125,086 A | * | 6/1992 | Perazzoli, Jr. | G06F 12/08 711/159 |
| 5,555,399 A | * | 9/1996 | Waldron | G06F 12/123 711/133 |
| 5,640,533 A | * | 6/1997 | Hays | G06F 12/1027 711/133 |
| 5,687,368 A | * | 11/1997 | Nilsen | G06F 12/0269 |

(Continued)

FOREIGN PATENT DOCUMENTS

KR      10-0907722 B1    7/2009

OTHER PUBLICATIONS

Kim et al.; "Controlling Physical Memory Fragmentation in Mobile Systems"; Association for Computing Machinery; Jun. 13-14, 2015; Portland, Oregon, USA; 15 pages.

*Primary Examiner* — Adam Lee

(57) ABSTRACT

Disclosed is a method of managing a memory of an electronic device, including: dividing a physical memory into one or more regions including consecutive pages; when there is a memory allocation request of a process or an operating system, allocating a physical memory space to a region including a free page; and configuring a domain by collecting one or more regions having the same characteristic among the regions, to which the memory is allocated.

14 Claims, 14 Drawing Sheets

(56) References Cited

U.S. PATENT DOCUMENTS

| | | | | |
|---|---|---|---|---|
| 5,771,383 A * | 6/1998 | Magee | G06F 9/544 | 718/100 |
| 5,897,660 A * | 4/1999 | Reinders | G06F 9/5016 | 711/170 |
| 5,951,670 A * | 9/1999 | Glew | G06F 9/30098 | 712/200 |
| 6,049,897 A * | 4/2000 | Zaidi | G06F 12/1441 | 711/220 |
| 6,182,089 B1 * | 1/2001 | Ganapathy | G06F 12/023 | |
| 6,275,917 B1 * | 8/2001 | Okada | G06F 12/1027 | 711/170 |
| 6,286,075 B1 * | 9/2001 | Stracovsky | G06F 12/0215 | 365/230.01 |
| 6,366,996 B1 * | 4/2002 | Hobson | G06F 12/023 | 711/170 |
| 7,159,094 B1 * | 1/2007 | Cholleti | G06F 12/023 | 711/165 |
| 7,278,006 B2 | 10/2007 | Rothman et al. | | |
| 7,509,461 B1 * | 3/2009 | Bhayana | G06F 12/0866 | 711/144 |
| 8,209,510 B1 * | 6/2012 | Thathapudi | G06F 12/145 | 711/163 |
| 8,819,386 B1 * | 8/2014 | Mather | G06F 12/10 | 711/202 |
| 9,026,737 B1 * | 5/2015 | Armangau | G06F 12/0822 | 711/118 |
| 9,760,292 B2 * | 9/2017 | Oohira | G06F 3/0616 | |
| 2002/0199075 A1 * | 12/2002 | Jacobs | G06F 12/023 | 711/163 |
| 2005/0193169 A1 * | 9/2005 | Ahluwalia | G06F 12/1009 | 711/115 |
| 2005/0273570 A1 * | 12/2005 | DeSouter | G06F 12/0292 | 711/203 |
| 2007/0011421 A1 * | 1/2007 | Keller, Jr. | G06F 1/3225 | 711/165 |
| 2007/0033331 A1 * | 2/2007 | Sinclair | G06F 12/0246 | 711/103 |
| 2007/0214338 A1 * | 9/2007 | Mizuno | G06F 3/0608 | 711/170 |
| 2008/0120488 A1 * | 5/2008 | Woo | G06F 12/0246 | 711/209 |
| 2008/0270680 A1 * | 10/2008 | Chang | G11C 16/10 | 711/103 |
| 2010/0211616 A1 * | 8/2010 | Khandelwal | G06F 12/0868 | 707/812 |
| 2010/0306444 A1 * | 12/2010 | Shirley | G06F 12/0802 | 711/6 |
| 2011/0099347 A1 * | 4/2011 | Plasek | G06F 9/5016 | 711/163 |
| 2012/0060012 A1 * | 3/2012 | Olszewski | G06F 12/1009 | 711/171 |
| 2012/0131285 A1 * | 5/2012 | Leshchiner | G06F 9/52 | 711/147 |
| 2013/0145073 A1 * | 6/2013 | Tuch | G06F 12/023 | 711/6 |
| 2013/0145078 A1 * | 6/2013 | Cheng | G06F 12/0246 | 711/103 |
| 2013/0326166 A1 * | 12/2013 | Desai | G06F 9/5016 | 711/158 |
| 2014/0310476 A1 * | 10/2014 | Kruus | G06F 12/0871 | 711/133 |
| 2015/0220447 A1 * | 8/2015 | Okamoto | G06F 12/023 | 711/130 |
| 2016/0110249 A1 * | 4/2016 | Orme | G06F 3/0619 | 714/6.24 |
| 2016/0170871 A1 * | 6/2016 | Hyun | G06F 3/06 | 711/103 |
| 2016/0328001 A1 * | 11/2016 | Sharda | G06F 1/3234 | |
| 2016/0335195 A1 * | 11/2016 | Kawamura | G06F 12/0246 | |

* cited by examiner

ELECTRONIC DEVICE AND METHOD OF MANAGING MEMORY OF ELECTRONIC DEVICE

CROSS-REFERENCE TO RELATED APPLICATION(S) AND CLAIM OF PRIORITY

The present application is related to and claims the benefit under 35 U.S.C. § 119(a) of Korean Patent Application No. 10-2015-0080217, filed on Jun. 5, 2015, which is hereby incorporated by reference for all purposes as if fully set forth herein.

TECHNICAL FIELD

The present disclosure relates to a method of managing a memory, and an electronic device that includes the same.

BACKGROUND

Recently, electronic devices, such as a smart phone, a tablet Personal Computer (PC), a Portable Multimedia Player (PMP), a Personal Digital Assistant (PDA), a laptop PC, and a wearable device including a wrist watch, and a Head-Mounted Display (HMD), include various kinds of applications. When the various kinds of applications are driven in the electronic device, a physical memory is fragmented and the performance of the system is degraded due to the frequent generation and termination of a process.

SUMMARY

To address the above-discussed deficiencies, it is a primary object to provide a method of managing a memory, which is configured to improve the fragmentation of a memory, in spite of a repeated generation and termination of a process, by assigning pages that include the same life cycle (or a deallocation cycle) at consecutive spaces in a physical memory, and an electronic device that includes the same.

In accordance with an embodiment of the present disclosure, a method of managing a memory of an electronic device is provided. The method includes: dividing a physical memory into one or more regions including consecutive pages; when there is a memory allocation request of a process or an operating system, allocating a physical memory space to a region including a free page; and configuring a domain by collecting one or more regions that include a same characteristic among the regions, to which the memory is allocated.

In accordance with an embodiment of the present disclosure, an electronic device, includes: a storage device; a memory; and a processor, wherein the processor makes a control so as to divides a physical memory into one or more regions including consecutive pages, when there is a memory allocation request of a process or an operating system, allocates a physical memory space to a region including a free page, and configures a domain by collecting one or more regions that include a same characteristic among the regions, to which the memory is allocated.

The electronic device and the method of managing the memory of the electronic device according to various embodiments of the present disclosure allocate pages that include the same life cycle to physical consecutive memories and collect the memory, thereby preventing or reducing a memory fragmentation phenomenon and decreasing the waste of resources that are associated with memory migration for solving or reducing the fragmentation phenomenon.

The electronic device and the method of managing the memory of the electronic device according to various embodiments of the present disclosure allocate pages that include the same life cycle to physical consecutive memories and collect the memory, thereby decreasing time associated with performing the allocation of the memory.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
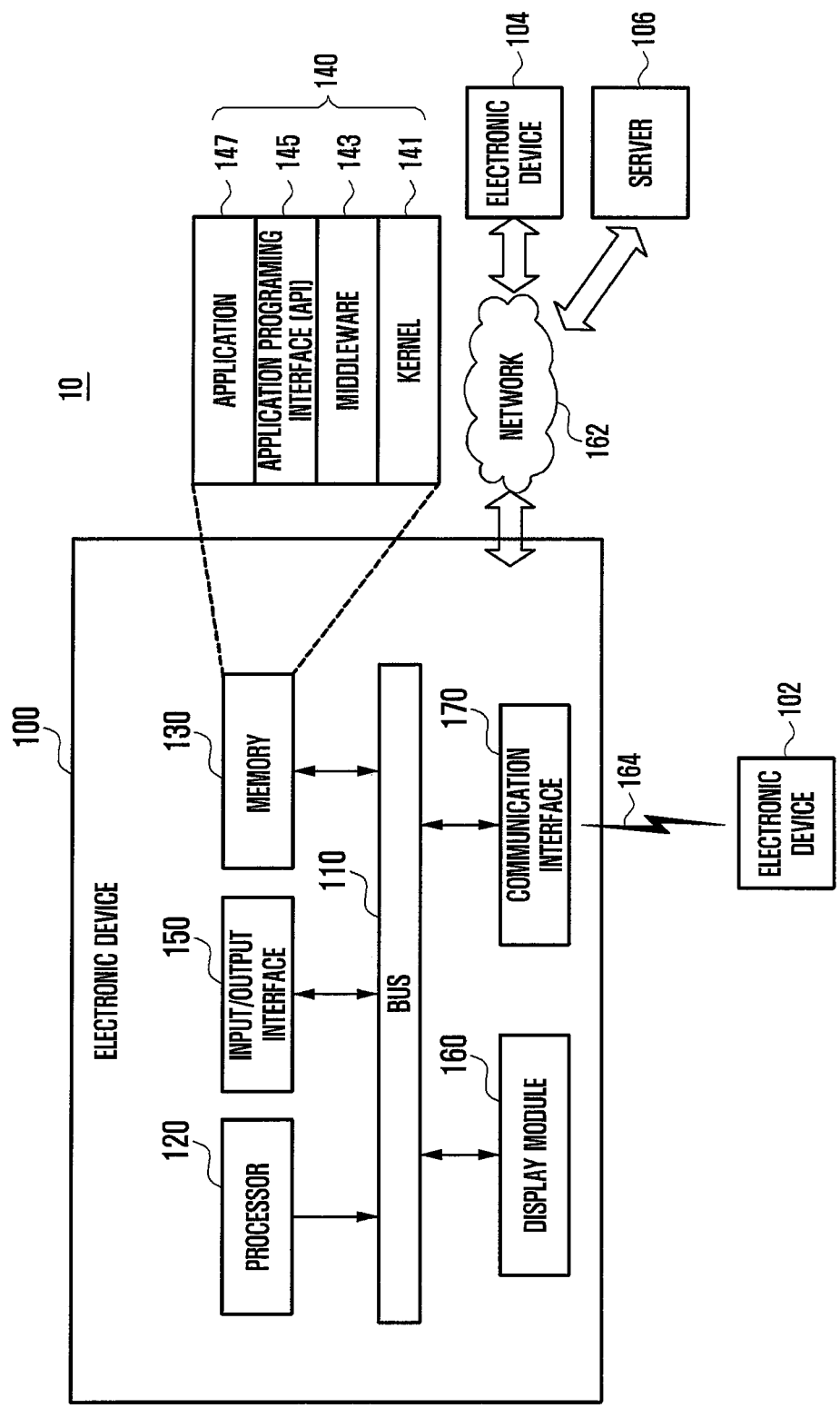
FIG. 1 is a diagram illustrating an example of an electronic device within a network environment according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, the present disclosure will be described with reference to the accompanying drawings. Although specific embodiments are illustrated in the drawings and related detailed descriptions are discussed in the present specification, the present disclosure may include various modifications and several embodiments. However, various embodiments of the present disclosure are not limited to a specific implementation or embodied form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used to describe embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to include the meanings equal to the contextual meanings in the relevant field of art, and are not to be interpreted to include ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance that includes a communication function. The smart home appliance may include at least one of a television (TV), a digital video disk (DVD) player, an audio player, an air conditioner, a cleaner, an oven, a microwave oven, a washing machine, an air cleaner, a set-top box, a TV box (for example, Samsung HomeSync®, Apple TV®, or Google TV®), game consoles, an electronic dictionary, an electronic key, a camcorder, and an electronic frame.

According to some embodiments, the electronic device includes at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and a measuring device (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

According to an embodiment of the present disclosure, a screen of an electronic device is split into at least two windows according to a predefined split manner and displayed through a display of an electronic device. The windows are defined as split windows. According to one embodiment, the split windows are defined as windows displayed on a display of an electronic display not to be superposed one on another.

According to an embodiment of the present disclosure, a popup window is defined as a window displayed on a display of an electronic device to hide or to be superposed on a portion of a screen under execution.

According to an embodiment of the present disclosure, an electronic device using split windows and a popup window is configured to display two or more application execution screens or function execution screens. Thus, the split windows and the popup window are defined as a multi-window.

Hereinafter, an electronic device according to various embodiments will be described with reference to the accompanying drawings. As used herein, the term "user" indicates a person who uses an electronic device or a device (e.g., an artificial intelligence electronic device) that includes or utilizes an electronic device.

FIG. 1 illustrates a network environment 10 including an electronic device 100 according to various embodiments of the present disclosure. Referring to FIG. 1, the electronic device 100 includes a bus 110, a processor 120, a memory 130, a user input module 150, a display module 160 and a communication module 170.

The bus 110 may be a circuit connecting the above described components and transmitting communication (for example, a control message) between the above described components. The processor 120 receives commands from other components (for example, the memory 130, the user input module 150, the display module 160, the communication module 170) through the bus 110, analyzes the received commands, and executes calculation or data processing according to the analyzed commands. The memory 130 stores commands or data received from the processor 120 or other components (for example, the user input module 150, the display module 160, or the communication module 170) or generated by the processor 120 or other components. The memory 130 includes programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules (for example, the middleware 143, the API 145, or the application 147). Further, the kernel 141 provides an interface for accessing individual components of the electronic device 100 from the middleware 143, the API 145, or the application 147 to control or manage the components. The middleware 143 performs a relay function of allowing the API 145 or the application 147 to communicate with the kernel 141 to exchange data. Further, when requests are received from the application 147, the middleware 143 performs a control for the operation requests (for example, scheduling or load balancing) by using a method of assigning a priority to the application 147, by which system resources (for example, the bus 110, the processor 120, the memory 130 and the like) of the electronic device 100 can be used.

The API 145 is an interface by which the application 147 can control a function provided by the kernel 141 or the middleware 143 and includes, for example, at least one interface or function (for example, command) for a file control, a window control, image processing, or a character control. The user input module 150 can receive, for example, a command and/or data from a user, and transfer the received command and/or data to the processor 120 and/or the memory 130 through the bus 110. The display module 160 can display an image, a video, and/or data to a user.

According to an embodiment, the display module 160 displays a graphic user interface image for interaction between the user and the electronic device 100. According to various embodiments, the graphic user interface image includes interface information to activate a function for correcting color of the image to be projected onto the screen. The interface information may be in the form of, for example, a button, a menu, or an icon. The communication module 170 connects communication between the electronic device 100 and the external device (for example, electronic device 102, 104 or server 106). For example, the communication module 170 may access a network 162 through wireless or wired communication to communicate with the external device. The wireless communication includes at least one of, for example, WiFi, BlueTooth® (BT), Near Field Communication (NFC), a Global Positioning System (GPS), and cellular communication (for example, long-term evolution (LTE), long-term evolution advanced (LTE-A), code division multiple access (CDMA), wideband code division multiple access (WCDMA), universal mobile telecommunications systems (UMTS), wireless broadband (Wi-Bro) or global system for mobile communications (GSM)). The wired communication includes at least one of, for example, a Universal Serial Bus (USB), a High Definition Multimedia Interface (HDMI), a Recommended Standard 232 (RS-232), or a Plain Old Telephone Service (POTS).

According to an embodiment, the server 106 supports driving of the electronic device 100 by performing at least one operation (or function) implemented by the electronic device 100. For example, the server 106 may include a communication control server module that supports the communication module 170 implemented in the electronic device 100. For example, the communication control server module includes at least one of the components of the communication module 170 to perform (on behalf of the communication module 170) at least one operation performed by the communication module 170.

Figure 2:
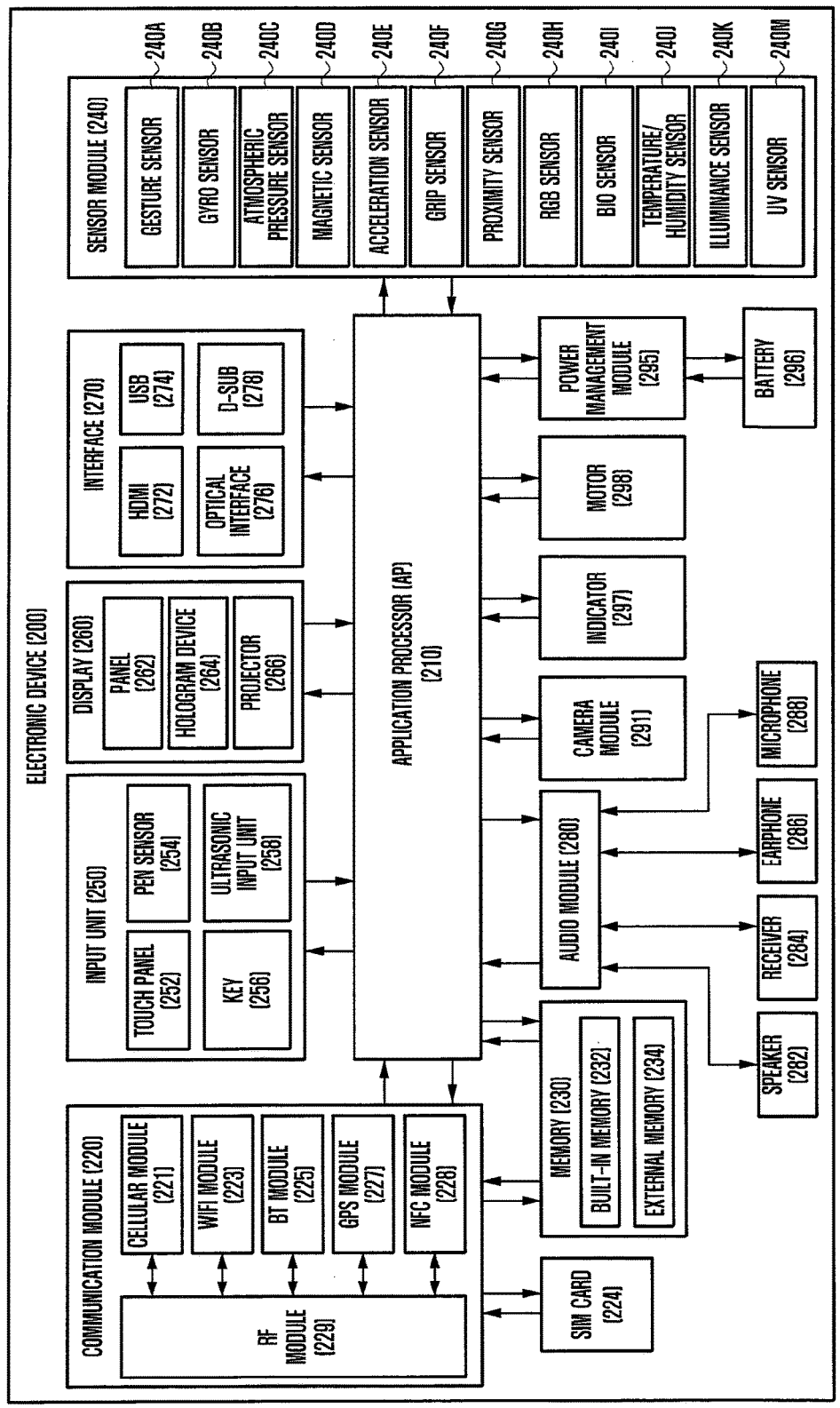
FIG. 2 is a block diagram of an electronic device according to various embodiments of the present disclosure.

FIG. 2 is a block diagram of an electronic device 200 according to various embodiments of the present disclosure. The electronic device 200 is configured to be, for example, a whole or a part of the electronic device 100 illustrated in FIG. 1. Referring to FIG. 2, the electronic device 200 includes one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the AP 210 may further include a Graphic Processing Unit (GPU).

The communication module 220 (for example, communication module 170) transmits/receives data in communication between different electronic devices (for example, the electronic device 104 and the server 106) connected to the electronic device 200 (for example, electronic device 100) through a network (for example, 162). According to an embodiment, the communication module 220 includes a cellular module 221, a WiFi module 223, a BlueTooth® (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, communication processor) may load a command or data received from at least one of a non-volatile memory and other components connected to each of the AP 210 and the cellular module 221 to a volatile memory, and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as blocks separate from each other in FIG. 2, at least some (for example, two or more) of the cellular module 221, the WiFi module 223, the BT module 225, the GPS module 227, and the NFC module 228 may be included in one Integrated Chip (IC) or one IC package according to an embodiment of this disclosure. For example, at least some (for example, the communication processor corresponding to the cellular module 221 and the communication processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to an embodiment of this disclosure.

The SIM card 224 is a card including a Subscriber Identification Module and may be inserted into a slot formed in a portion of the electronic device 200. The SIM card 224 includes unique identification information (for example, Integrated Circuit Card IDentifier (ICCID)) or subscriber information (for example, International Mobile Subscriber Identity (IMSI)).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 is a Solid State Drive (SSD). The external memory 234 may further includes a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 is functionally connected to the electronic device 200 through various interfaces. According to an embodiment, the electronic device 200 further includes a storage device (or storage medium) such as a hard drive.

The sensor module 240 measures a physical quantity or detects an operation state of the electronic device 200, and converts the measured or detected information to an electronic signal. The sensor module 240 includes, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and an Ultra Violet (UV) sensor 240M. Additionally or alternatively, the sensor module 240 includes, for example, an E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication module 220.

The display 260 (for example, display module 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication module 170 illustrated in FIG. 1. Additionally or alternatively, the interface 270 includes, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 are included in, for example, the user input module 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power management module 295 manages power of the electronic device 200. Although not illustrated, the power management module 295 may include, for example, a Power Management Integrated Circuit (PMIC), a charger Integrated Circuit (IC), or a battery or fuel gauge.

The PMIC is mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method includes, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
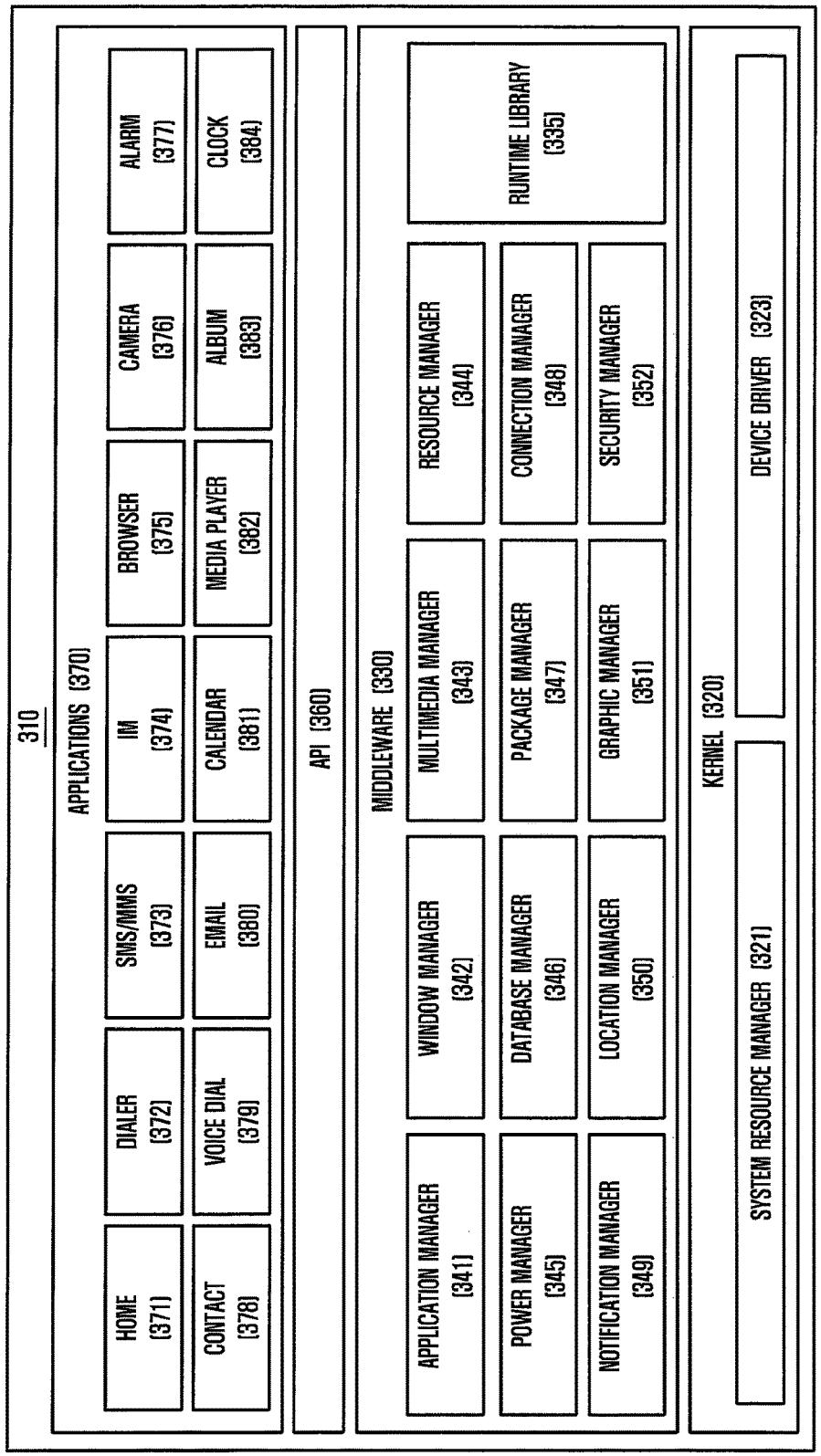
FIG. 3 is a block diagram of a program module according to various embodiments of the present disclosure.

FIG. 3 is a block diagram of a programming module 310 according to an embodiment. The programming module 310 (for example, programming module 140) may be included (stored) in the electronic device 100 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 200) to include an Operating System (OS) controlling resources related to the electronic device (for example, electronic device 100) or various applications (for example, applications 370) driving on the OS. For example, the OS may be Android®, iOS®, Windows®, Symbian®, Tizen®, Bada® or the like. Referring to FIG. 3, the programming module 310 includes a kernel 320, a middleware 330, an Application Programming Interface (API) 360, and applications 370.

The kernel 320 (for example, kernel 141) includes a system resource manager 321 and a device driver 323. The system resource manager 321 includes, for example, a process manager, a memory manager, and a file system manager. The system resource manager 321 performs a system resource control, allocation, and recall. The device driver 323 includes, for example, a display driver, a camera driver, a Bluetooth® driver, a shared memory driver, a USB driver, a keypad driver, a WiFi driver, or an audio driver. Further, according to an embodiment, the device driver 323 may include an Inter-Process Communication (IPC) driver. The middleware 330 includes a plurality of modules prepared in advance to provide a function used in common by the applications 370. Further, the middleware 330 provides a function through the API 360 to allow the applications 370 to efficiently use limited system resources within the electronic device. For example, as illustrated in FIG. 3, the middleware 300 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a compiler to add a new function through a programming language while the applications 370 are executed. According to an embodiment, the runtime library 335 executes input and output, management of a memory, a function associated with an arithmetic function, and the like. The application manager 341 manages, for example, a life cycle of at least one of the applications 370. The window manager 342 manages graphical user interface (GUI) resources used on the screen. The multimedia manager 343 detects a format associated with reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information associated with the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth®. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function associated with a system security or a user authentication. According to an embodiment, when the electronic device (for example, electronic device 100 or 200) includes a call function, the middleware 330 further includes a telephony manager for managing a voice of the electronic device or a video call function. The middleware 330 generates a new middleware module through a combination of various functions of the aforementioned internal component modules and uses the generated new middleware module. The middleware 330 provides a module specified for each type of operating system to provide a differentiated function. Further, the middleware 330 dynamically deletes some of the conventional components or adds new components. Accordingly, some of the components described in the embodiments of the present disclosure may be omitted, replaced with other components having different names but performing similar functions, or other components may be further included.

The API 360 (for example, API 145) is a set of API programming functions, and provides a different configuration according to an operating system. For example, in Android® or iOS®, a single API set may be provided for each platform. In Tizen®, two or more API sets may be provided. The applications 370, which may include an application similar to the application 134, may include, for example, a preloaded application and/or a third party application. The applications 370 include at least one of a home application 371, a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 is implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 310, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
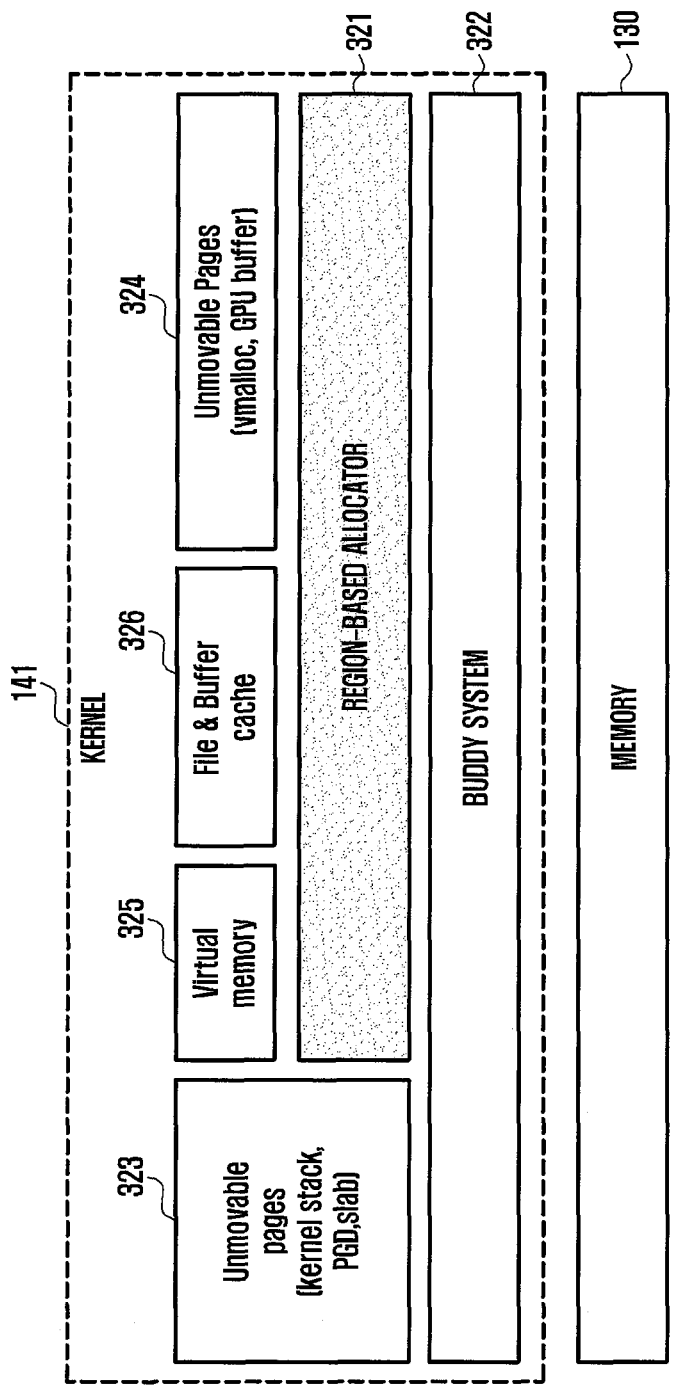
FIG. 4 is a diagram illustrating a hierarchy of an electronic device according to various embodiments of the present disclosure.

FIG. 4 is a diagram illustrating a hierarchy of an electronic device 100 according to various embodiments of the present disclosure.

Referring to FIG. 4, the electronic device 100 includes a memory 130 and a kernel 141. The memory 130 is a physical memory, for example, a main memory device, such as a Random Access Memory (RAM).

The processor 120 includes a Memory Management Unit (MMU) and/or an Input/Output Memory Management Unit (IOMMU), which converts a virtual address into a physical address. The MMU or the IOMMU is not limited to the processor 120, and may include a separate configuration from that of the processor 120. The IOMMU is an MMU device, which includes an input/output interface configured to utilize a bus capable of performing a Direct Memory Access (DMA) and a main memory device may access.

When a process requests a memory allocation, a peripheral device included in the processor 120 or the electronic device 100 transfers a virtual memory address stored in an auxiliary memory device (for example, a storage device) to the MMU and/or the IOMMU, and the MMU and/or the IOMMU converts the virtual memory address into an actual physical address in the memory 130.

The virtual address may be operated according to a paging method, which organizes a memory into a plurality of blocks that include a uniform size. In this case, the block that includes the uniform size may be referred to as a page. A virtual address space may be divided in a unit of a page, and an actual physical memory address space may be divided into frames (or pages), such as a page size, and may be applied.

The kernel 141 according to an embodiment of the present disclosure includes a region based allocator 321, a buddy system 322, and a plurality of pages 323, 324, 325, and 326 associated with performing other parts of an operating system and an application program.

The region based allocator 321 manages the physical memory by dividing the physical memory into one or more regions including consecutive pages, and when the process requests a memory allocation, the region based allocator 321 allocates a memory address space to a region including a free page. The region based allocator 321 collects one or more regions that include the same characteristic, and configures the collected regions as a domain. The region based allocator 321 manages the region and the domain, and performs an operation of allocating the process to the region including the free page and the domain. When the region based allocator 321 allocates the region and the domain of the physical memory according to the request of the process, the region based allocator 321 requests a memory allocation from the buddy system 322.

When the buddy system 322 receives the memory allocation request from the region based allocator 321, the buddy system 322 allocates the memory in the unit of the page of the physical memory for the process.

The kernel 141 is a core part of an Operating System (OS), and provides various services associated with performing other parts of the OS and an application. For example, the electronic device 100 maintains security of a processor, hardware, and the like, and maintains integrity of the entire configuration by using the kernel 141.

The electronic device 100 allocates, controls, and collects a resource, such as a memory, by using the kernel 141. The kernel 141 includes a page related to a process and also includes pages related to a system in order to manage the memory.

The electronic device 100 uses a compaction method and a page block method in order to prevent or reduce the memory from being fragmentized. The compaction method is an operation of migrating an allocated page and securing a consecutive free physical memory space. The page block method is an operation of grouping a physical memory address space based on a migration characteristic of a page, and is a method of preventing or reducing a failure in securing a free memory space and allocating a memory by an unmovable page.

The compaction operation according to an embodiment of the present disclosure may be performed within a region. The compaction operation according to an embodiment of the present disclosure may be performed in a case where a process or an OS is being executed in a background.

The kernel 141 divides the page related to the process and the pages related to the system into movable pages 325 and 326 and unmovable pages 323 and 324, and manages the divided movable and unmovable pages.

For example, the movable pages 325 and 326 may include at least one of a virtual memory page, a file page, and a cache page.

The virtual memory page may be a page for managing a virtual memory. The file page may be a page managing materials or data related to the process, to which the memory is allocated. The cache page may be a page managing data related to a cache.

For example, the unmovable pages 323 and 324 each include at least one of a kernel stack page, a page table (for example, a Page Global Directory (PGD)) page, a slab page, a vmalloc page, a Graphic Processing Unit (GPU) buffer page, and an Input/Output (I/O) buffer page.

The kernel 141 performs processing while putting a stack in every process in order to prevent the kernel 141 from managing the stack one by one. For example, the kernel stack page may include a return address for returning to a user space, a parameter transferred from the user space to the kernel, and the like.

The page table is a table, in which a mapping relation between the virtual memory and the physical memory is set in order to allocate a virtual memory to a physical memory.

When the process requests a memory having a smaller size than that of a page that is a minimum unit of the memory management, the kernel 141 uses a slab in order to perform a memory allocation of an object (or a process and a data structure) having the aforementioned characteristic. The slab performs an operation of managing a cache for the object, and the slab first generates a cache for the object and allocates the object in the cache as necessary. The slab page may be data for the object managed by the slab and data related to an object memory management.

The kernel 141 generates, maintains, and manages the system resources as described above, and to this end, the kernel 141 generates a kernel object. The kernel object page may be data for generating, maintaining, and managing the system resource. The kernel object page may be an unmovable page.

The kernel object may be divided into a kmalloc object consecutive in a physical address space, and a vmalloc object consecutive in a virtual address apace, and the vmalloc object may be an object that is physically divided and managed due to a relatively large allocated memory size.

The vmalloc page may be data corresponding to the vmalloc object and data related to a management.

In addition, the I/O buffer page including information about a buffer of the IOMMU may also be included in the unmovable pages 323 or 324.

The virtual memory process, the file process, the page cache, a kernel stack, the page table (for example, the PGD), the slab, the vmalloc, the GPU buffer, and the I/O buffer may be included in the OS, and the OS or the processes included in the OS may also allocate the memory by region-based memory allocation method of various embodiments of the present disclosure, as well as the process of the application.

Figure 5:
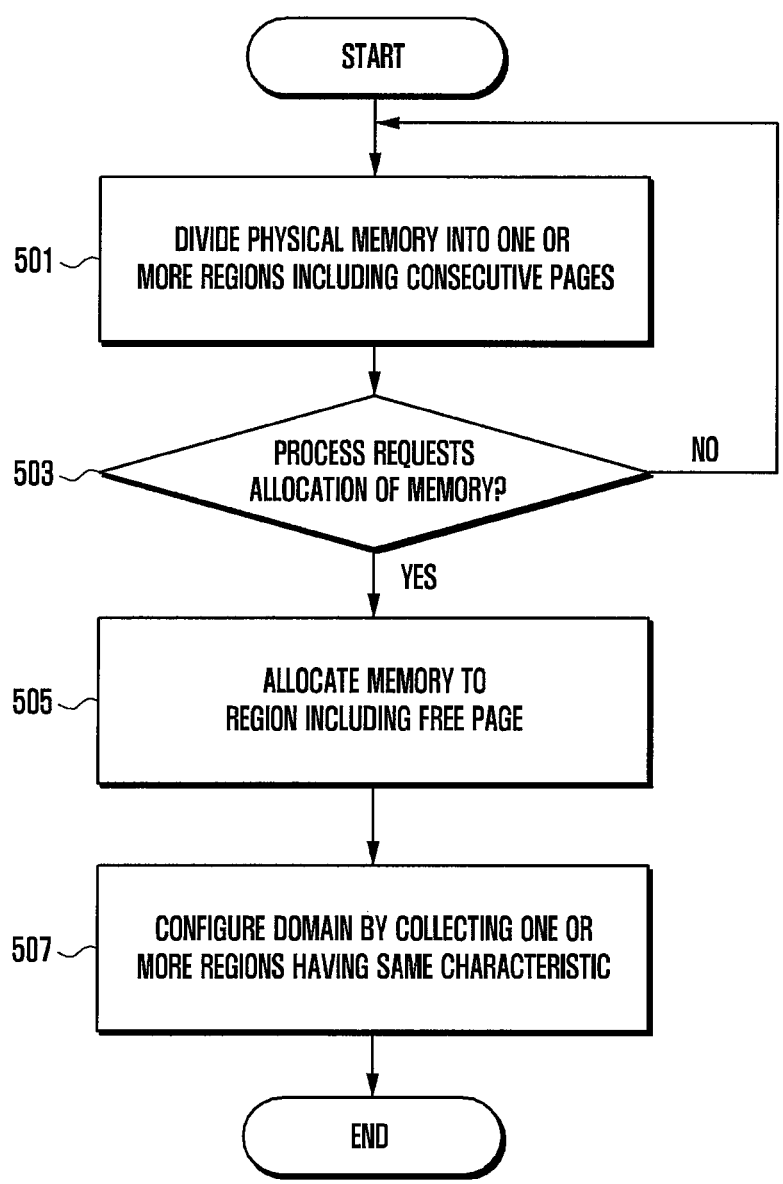
FIG. 5 is a flowchart illustrating a method of managing a memory according to various embodiments of the present disclosure.

FIG. 5 is a flowchart illustrating a method of managing a memory according to various embodiments of the present disclosure.

In operation 501, the electronic device 100 divides a physical memory, for example, the memory 130, into one or more regions including consecutive pages using the region based allocator 321 under the control of the processor 120. A size of the region is determined according to the number of consecutive pages included. A size of the region may be changed according to a setting. For example, when a page is 4 KB, a size of the region that includes 2n pages may include a consecutive memory space of 4×2N KB. Alternatively, for example, when N is 5, a size of the region may be 128 KB. In various embodiments of the present disclosure, a size of the region may be 128 KB to 1 MB, in which N is from 5 to 8.

In operation 503, the electronic device 100 determines whether there is a memory allocation request of a process or an OS through the processor 120.

The process includes the OS or processes included in the OS, as well as a process of an application. The method of managing the memory includes various embodiments of the present disclosure, and the electronic device may manage the memory of the process or the OS also.

In operation 505, when there is the memory allocation request of the process or the OS, the electronic device 100 allocates a memory 130 address space to a region including a free page under the control of the processor 120.

In operation 507, the electronic device 100 collects one or more regions that include the same characteristic among the regions, to which the memory is allocated, configures the collected regions as a domain, and manages the domain by using the region based allocator 321 under the control of the processor 120.

The same characteristic may mean that a life cycle (or a deallocation cycle) of the process is the same, and includes a characteristic in that the pages included in the region are simultaneously deallocated when the process is terminated. As described above, when the pages included in the region are simultaneously deallocated when the process is terminated, it is possible to save resources and time associated with performing the compaction according to a memory fragmentation phenomenon, and to improve the memory fragmentation phenomenon.

Figure 6:
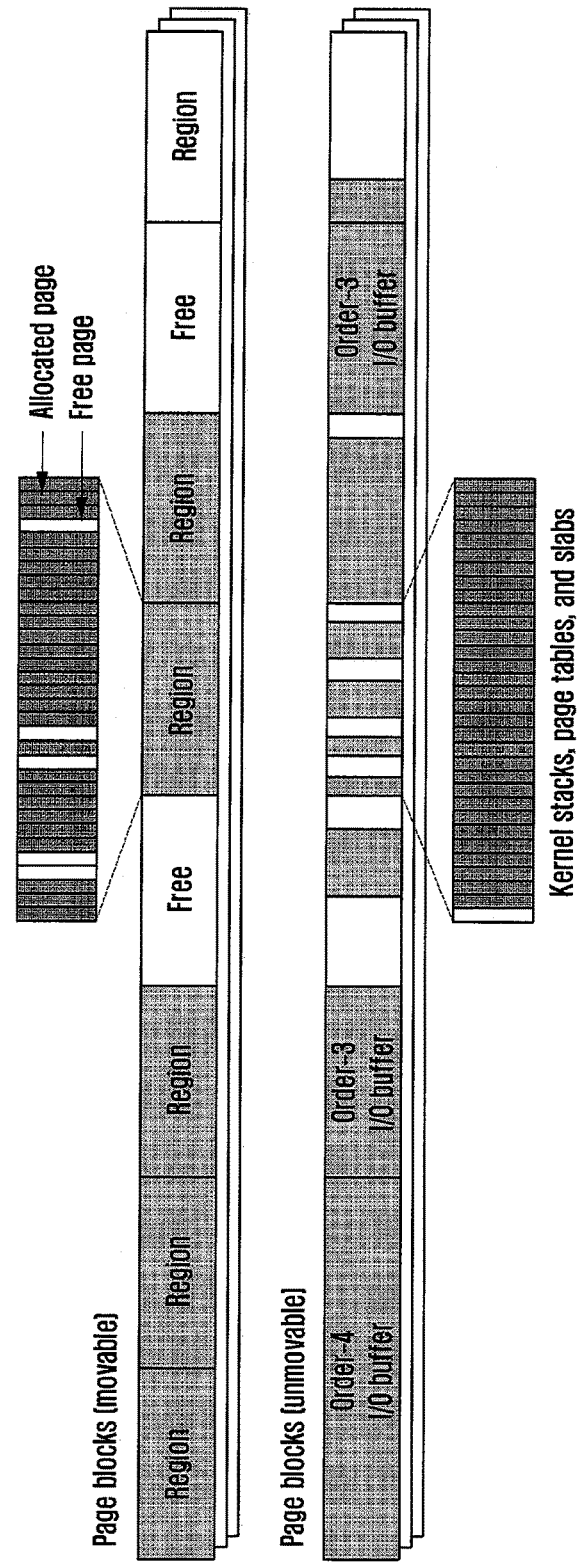
FIG. 6 is a block diagram illustrating a page block method according to various embodiments of the present disclosure.

FIG. 6 is a block diagram illustrating a page block method according to various embodiments of the present disclosure.

As described in FIGS. 4 and 5, the electronic device 100 divides the page into movable pages and unmovable pages, and manages the page using the page block method. The movable pages and the unmovable pages 323 and 324 are managed by dividing a memory address space into one or more regions including the consecutive pages.

The regions in the physical memory, for example, the memory 130, may be divided into an allocated region and a free region. In the allocated region, an allocated page and a free page may be non-consecutively present at the same time, and the electronic device 100 may perform the compaction operation within the region or the domain.

Figure 7:
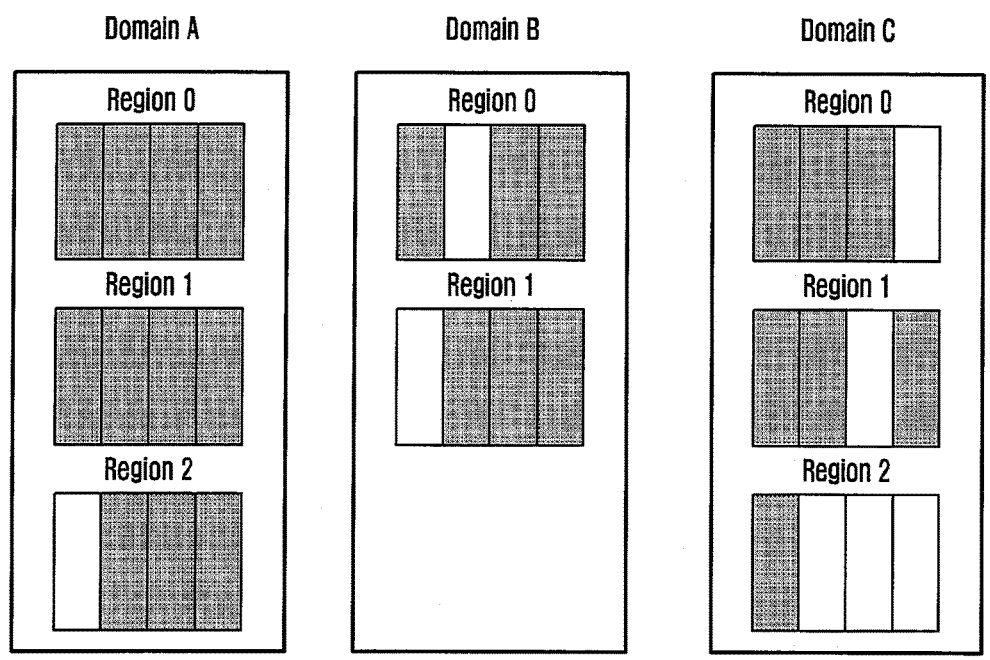
FIG. 7 is a diagram illustrating a region domain according to various embodiments of the present disclosure.

FIG. 7 is a diagram illustrating a region domain according to various embodiments of the present disclosure.

The electronic device 100 collects one or more regions that include the same characteristic and configures the collected regions as a domain by using the region based allocator 321. For example, domain A includes one or more regions (for example, region 0, region 1, and region 2), and each of the regions (region 0, region 1, and region 2) includes at least one of a free page or an allocated page.

Domain B includes one or more regions (for example, region 0 and region 1), and each of the regions (region 0 and region 1) includes a free page and an allocated page.

Domain C includes one or more regions (for example, region 0, region 1, and region 2), and each of the regions (region 0, region 1, and region 2) includes a free page and an allocated page.

Domain A, domain B, and domain C may be configured by collecting regions that include a life cycle (or a deallocation cycle) of the same process.

Figure 8:
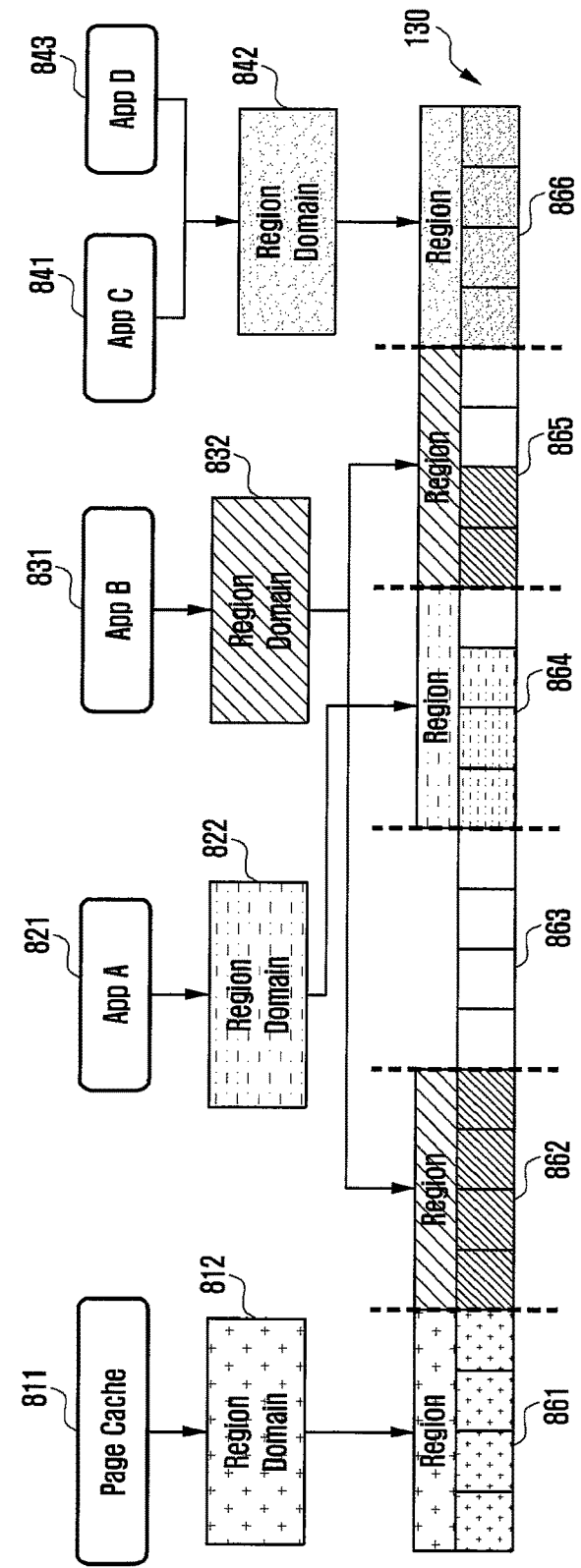
FIG. 8 is a diagram illustrating the method of managing the memory based on the region domain according to various embodiments of the present disclosure.

FIG. 8 is a diagram illustrating the method of managing the memory based on the region domain according to various embodiments of the present disclosure.

The processes, for example, a page cache 811, application A 821, application B 831, application C 841, and application D 843, allocate a memory in a unit of the region and configure domains 812, 822, 832, and 842, respectively.

When the page cache 811 makes a memory allocation request, the electronic device 100 allocates a memory space requested by the page cache 811 to a first region 861 which is an address space of the memory 130. In an embodiment of the present disclosure, the page cache 811 is included in the OS. In another embodiment, the page cache 811 is a process included in the OS.

The domain between the processes according to an embodiment of the present disclosure does not need to be consecutive or sequential with a previous domain, and the domain is configured to be allocated to the free region.

When the application A 821 makes a memory allocation request, the electronic device 100 allocates a memory space requested by the application A 821 to a fourth region 864 which is non-consecutive with respect to the domain of the page cache 811, which is the address space of the memory 130.

The regions included in the domain according to an embodiment of the present disclosure do not need to be consecutive spaces and may be physically divided.

For example, when the application B 831 makes a memory allocation request, the electronic device 100 allocates a memory space requested by the application B 831 to include a second region 862 and a fifth region 865, which are address spaces of the memory 130. Similar to the domain 832 of the application B 831, the allocated regions 862 and 865 do not need to be consecutive spaces and may be physically divided.

The region and the domain according to the embodiment of the present disclosure may be shared between the processes that include the similar attribute. For example, the application C 841 and the application D 843 may share the region 866 and the domain 842.

Figure 9:
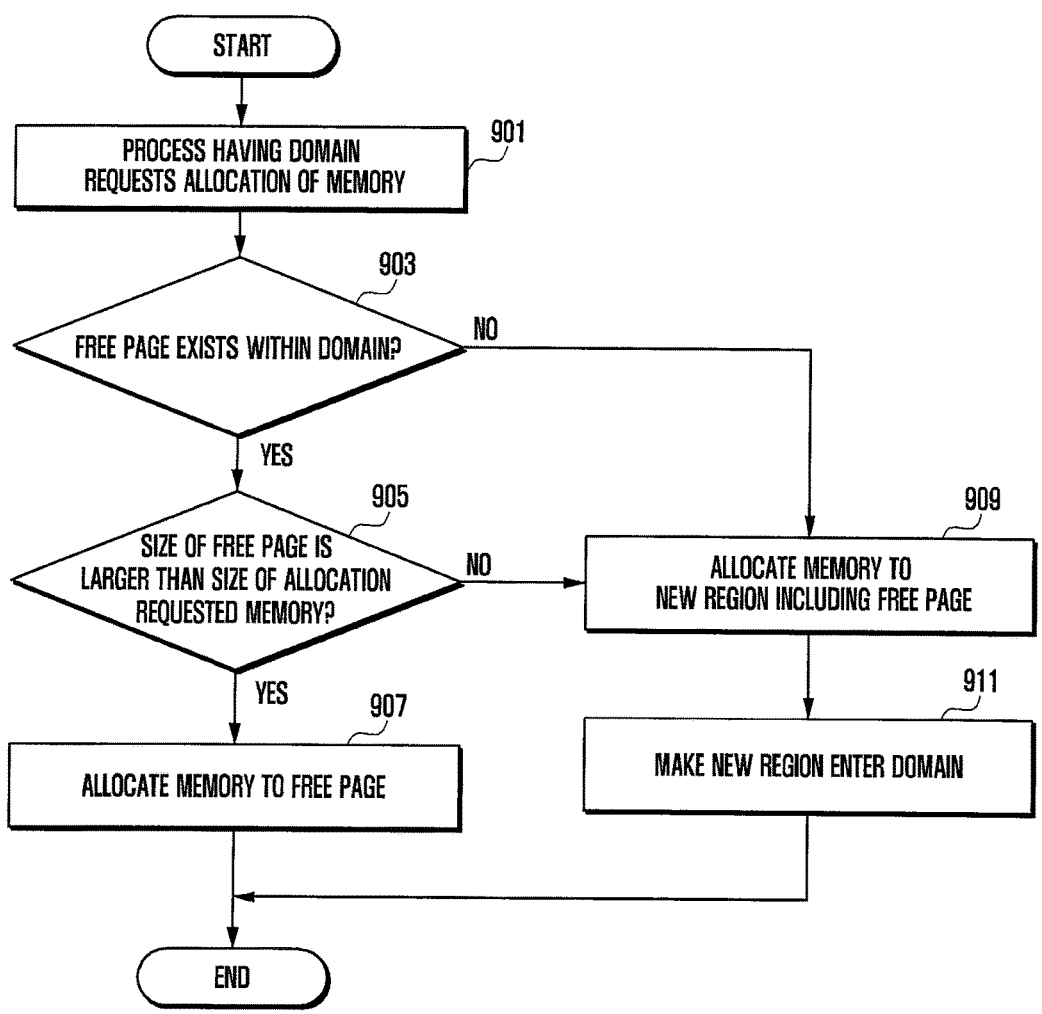
FIG. 9 is a flowchart illustrating a method of managing a memory according to various embodiments of the present disclosure.

FIG. 9 is a flowchart illustrating a method of managing a memory according to various embodiments of the present disclosure.

In operation 901, the electronic device 100 receives a memory allocation request of a process or an OS that includes a domain through the processor 120.

In operation 903, the electronic device 100 determines whether a free page is present in the domain by using the region based allocator 321 under the control of the processor 120.

When the free page is present in the domain, the electronic device 100 determines whether a size of the free page is larger than a memory size, which is allocation requested by the free page by using the region based allocator 321 and under the control of the processor 120 in operation 905.

When the size of the free page is larger than the memory size, which is allocation requested by the free page, the electronic device 100 allocates the memory requested by the process or the OS to the free page by using the region based allocator 321 under the control of the processor 120 in operation 907.

When the free page is not present in the domain or the size of the free page is smaller than the memory size, which is allocation requested by the free page, the electronic device 100 allocates the memory requested by the process or the OS to a new region including the free page under the control of the processor 120 in operation 909.

In operation 911, the electronic device 100 makes the new region enter the existing domain under the control of the processor 120.

Figure 10:
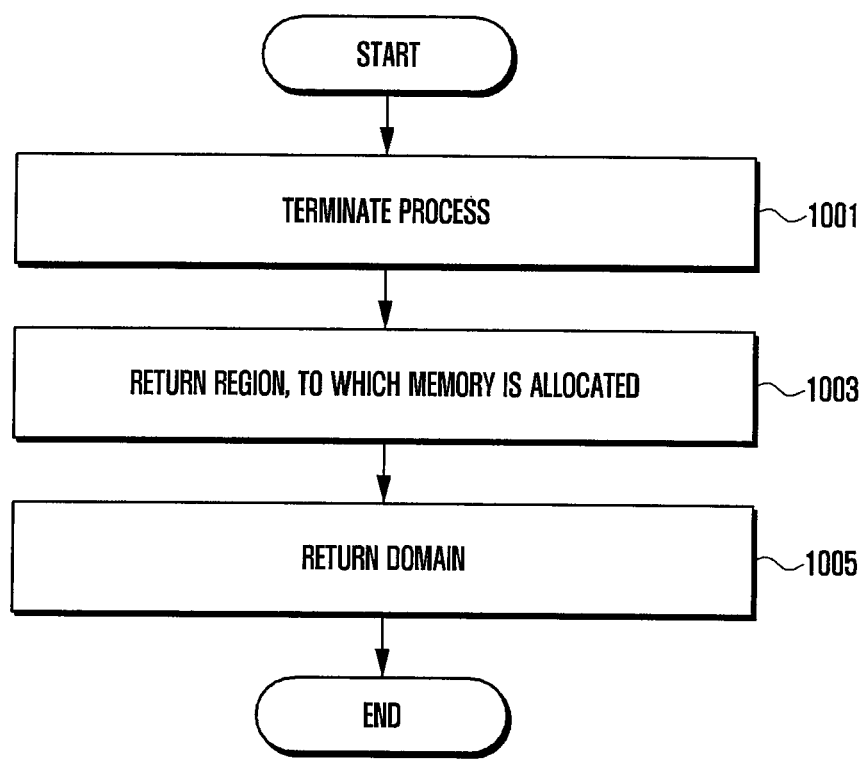
FIG. 10 is a flowchart illustrating a collection of an allocated memory according to various embodiments of the present disclosure.

FIG. 10 is a flowchart illustrating a collection of an allocated memory according to various embodiments of the present disclosure.

In operation 1001, a process or an OS currently executed in the electronic device 100 is terminated.

When the process or the OS is terminated, the electronic device 100 returns (or deallocates) the region, to which the memory is allocated, by using the region based allocator 321 in operation 1003 under the control of the processor 120.

When the process is terminated, the electronic device 100 returns (or deallocates) the domain, to which the memory is allocated, by using the region based allocator 321 under the control of the processor 120 in operation 1005.

When the region and/or the domain is returned, the electronic device 100 may collect pages by using the buddy system 322 under the control of the processor 120.

Figure 11:
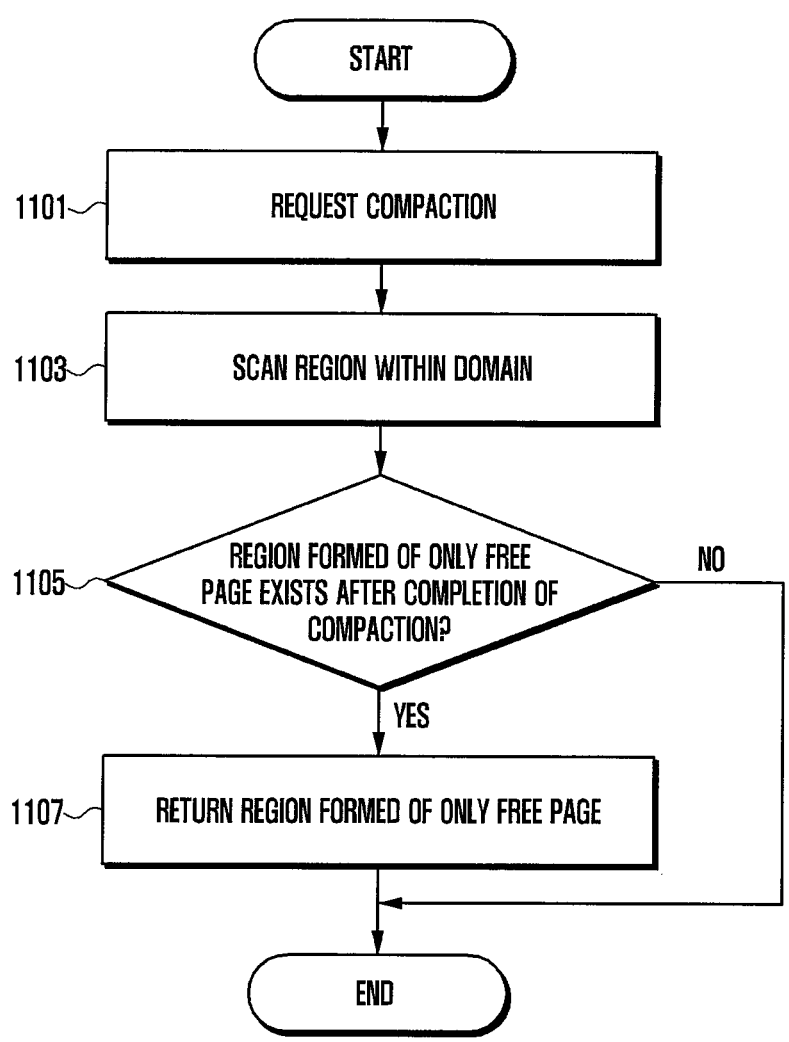
FIG. 11 is a flowchart illustrating a compaction method according to various embodiments of the present disclosure.

FIG. 11 is a flowchart illustrating a compaction method according to various embodiments of the present disclosure.

In operation 1101, when a memory fragmentation is generated, the electronic device 100 requests a compaction from the memory 130 through the processor and under the control of the processor 120. The compaction operation according to an embodiment of the present disclosure may be performed in a case where a process or an OS is being executed in a background. In various embodiments, when the process or the OS is being executed in a foreground, the compaction operation may not be performed.

In operation 1103, when the compaction is requested, the electronic device 100 scans a region within a domain, finds a free page and an allocated page, and moves the found free page and the found allocated page under the control of the processor 120.

In operation 1105, when the compaction is completed by moving the free region, the electronic device 100 determines whether a region including only the free page is present under the control of the processor 120.

In operation 1107, when the region including only the free page is present, the electronic device 100 returns the region including only the free page under the control of the processor 120.

Figure 12:
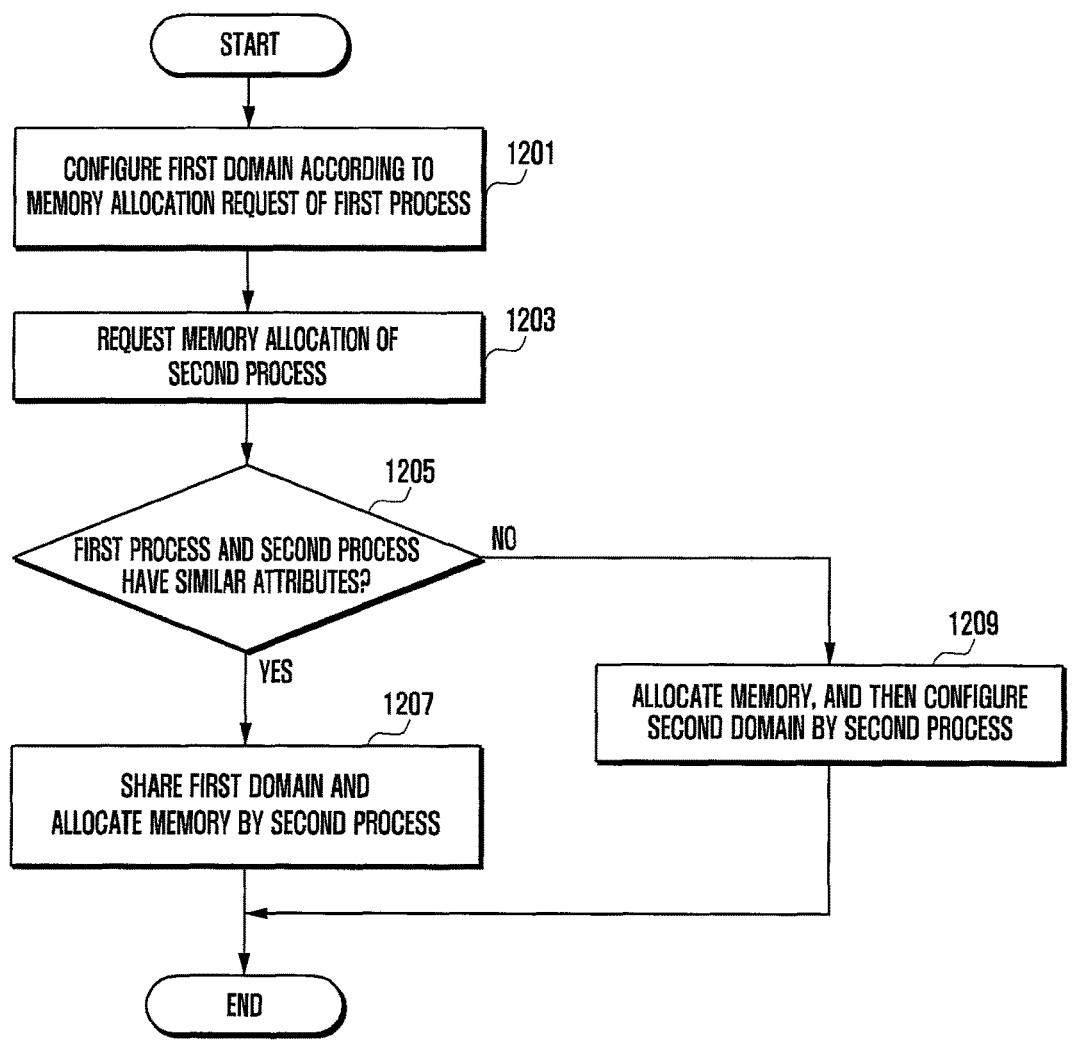
FIG. 12 is a flowchart illustrating a method of setting a sharing domain according to various embodiments of the present disclosure.

FIG. 12 is a flowchart illustrating a method of setting a sharing domain according to various embodiments of the present disclosure.

Referring to FIGS. 8 and 12, a region and a domain according to various embodiments of the present disclosure may be shared between the processes or the OSs that include a similar attribute. For example, the application C 841 and the application D 843 may share the region 866 and the domain 842.

In operation 1201, the electronic device 100 configures a first domain according to a memory allocation request of a first process (or a first OS) by using the region based allocator 321 under the control of the processor 120.

In operation 1203, the electronic device 100 receives a memory allocation request of a second process (or a second OS) through the processor 120.

In operation 1205, the electronic device 100 determines whether the first process (or the first OS) and the second process (or the second OS) include a similar attribute under the control of the processor 120.

In various embodiments of the present disclosure, the similar attribute may be a case where the processes (or the Oss) share a common page. In other embodiments of the present disclosure, when the processes (or the Oss) include a living attribute and are not generated or terminated by a life cycle (for example, living attributes that always or usually reside), it may be considered that the processes include the similar attribute. For example, the processes (or the Oss) that include the characteristic of residing in the system may be a process, such as a system server, a media server, and a zygote.

In operation 1207, when the first process (or the first OS) and the second process (or the second OS) include the similar attribute, the electronic device 100 allocates a region of the second process (or the second OS) and makes the allocated region of the second process (or the second OS) enter the first domain under the control of the processor 120. Alternatively, in operation 1207, when the first process (or the first OS) and the second process (or the second OS) include the similar attribute, the electronic device 100 shares the first domain and allocates a memory of the second process (or the second OS) in the first domain under the control of the processor 120.

In operation 1209, when the first process (or the first OS) and the second process (or the second OS) do not include the similar attribute, the electronic device 100 allocates a memory of the second process (or the second OS) and then configures a second domain that is different from the first domain under the control of the processor 120.

Figure 13:
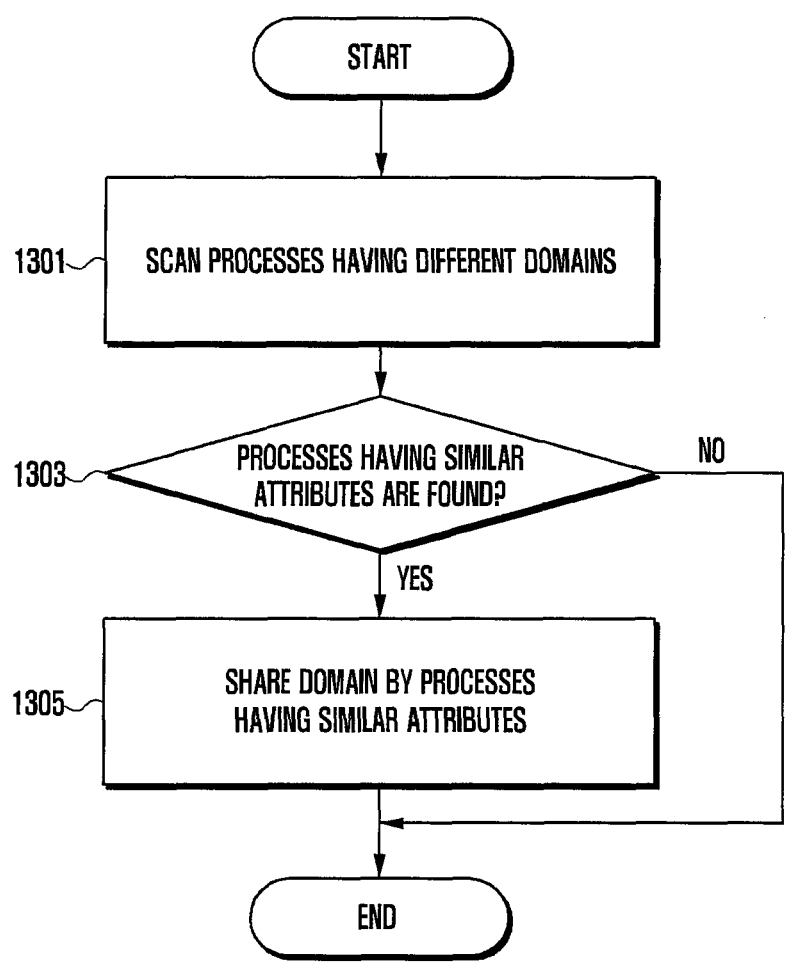
FIG. 13 is a flowchart illustrating a method of setting a sharing domain according to various embodiments of the present disclosure.

FIG. 13 is a flowchart illustrating a method of setting a sharing domain according to various embodiments of the present disclosure.

Referring to FIGS. 8 and 13, a region and a domain according to the embodiment of the present disclosure may be shared between the processes (or the Oss) that include the similar attribute. For example, the application C 841 and the application D 843 may share the region 866 and the domain 842.

In operation 1301, the electronic device 100 scans processes (or Oss) that include different domains under the control of the processor 120.

In operation 1303, the electronic device 100 determines if the processes (or the Oss) include the similar attribute under the control of the processor 120.

In operation 1305, when the processes (or the OSs) having the similar attribute are found, the electronic device 100 controls the domain to be shared between the processes (or the OSs) that include the similar attribute under the control of the processor 120 in operation 1305.

Figure 14:
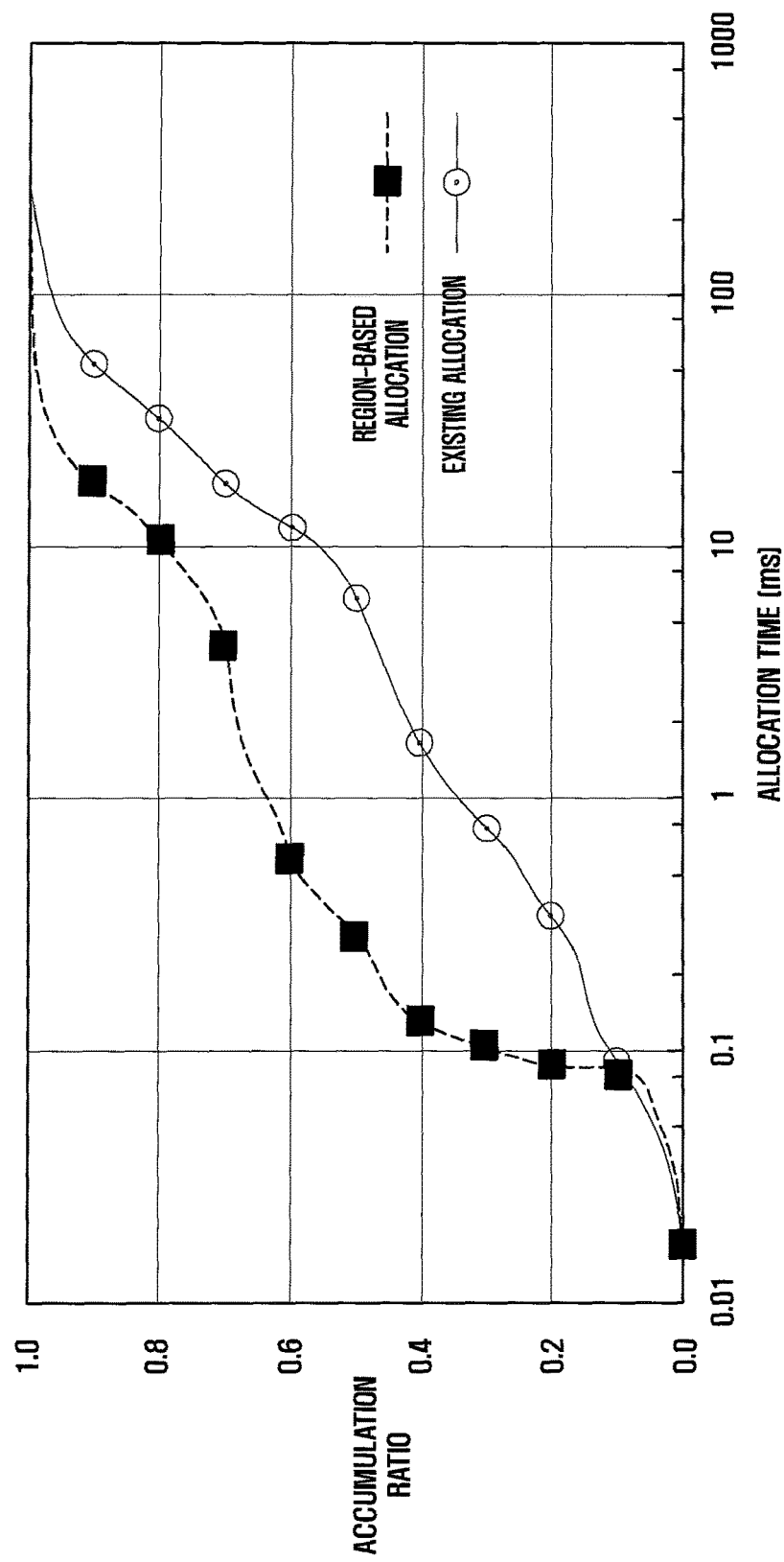
FIG. 14 is a graph illustrating a comparison of a memory allocation time according to the method of managing the memory according to various embodiments of the present disclosure and a method of managing a memory in the related art.

FIG. 14 is a graph illustrating a comparison of a memory allocation time according to the method of managing the memory according to various embodiments of the present disclosure and a method of managing a memory in the related art.

Referring to FIG. 14, when the memory is allocated based on a region, it is possible to improve the memory fragmentation phenomenon compared to the page unit allocation method, which is the allocation method in the related art, thereby rapidly the memory compared to the allocation method in the related art.

It should be understood by those skilled in the art that the above described embodiments are not restrictive since the embodiments can be implemented in other concrete forms without any change in the technical idea or characteristics of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method comprising:
   dividing a physical memory of an electronic device into a plurality of regions each having a plurality of memory pages, wherein a particular region of the plurality of region includes at least three free memory pages, and wherein at least two free memory pages are consecutive memory pages;
   allocating a first free memory page of the particular region to a first process of an operating system of the electronic device when a memory allocation request is received from the first process;
   grouping a subset of the plurality of regions based on a specific characteristic, wherein the specific characteristic is an attribute not generated or terminated by a life cycle of the first process, and wherein the subset of the plurality of regions excludes the particular region;
   configuring the grouped subset as a domain;
   allocating a second free memory page of the particular region to a second process of the operating system of the electronic device when a memory allocation request is received from the second process;
   determining whether the first process and the second process both include the attribute;
   when the first process and the second process both include the attribute, making the second free memory page of the particular region allocated to the second process enter the domain; and
   when the first process or the second process do not include the attribute, configuring the second free memory page of the particular region allocated to the second process as a new domain, wherein when the first process is terminated the first and second free memory pages are simultaneously deallocated.

2. The method of claim 1, further comprising:
   dividing the at least two consecutive free memory pages into at least one movable page and at least one unmovable page; and
   managing the movable and unmovable pages.

3. The method of claim 1, further comprising:
receiving another memory allocation request from the first process;
determining whether the second free memory page of the particular region allocated to the second process is present in the domain;
when the second free memory page of the particular region allocated to the second process is present in the domain, determining whether a size of the second free memory page of the particular region allocated to the second process is larger than a memory size of the first process requesting the another memory allocation; and
when the size of the second free memory page of the particular region allocated to the second process is larger than the memory size of the first process requesting the another memory allocation, allocating a third free memory page of the particular region to the first process.

4. The method of claim 3, further comprising:
when the second free memory page of the particular region allocated to the second process is not present in the domain, or the size of the second free memory page of the particular region allocated to the second process is smaller than or equal to the memory size of the first process requesting the another memory allocation, allocating the third free memory page of the particular region to the first process; and
entering the third free memory page into the domain.

5. The method of claim 1, further comprising:
terminating the first process and the second process; and
in response to the terminating, deallocating the memory pages of the first process and the second process and returning the domain.

6. The method of claim 1, further comprising:
receiving a request for performance of a compaction;
performing the compaction, wherein the compaction includes scanning the domain and migrating a found free memory page from the domain;
after performing the compaction, determining, whether only the domain without the found free memory page is present in the electronic device; and
when only the domain without the found free memory page is present in the electronic device, returning the domain.

7. The method of claim 1, further comprising:
scanning the first process and the second process, wherein the first process and the second process have different domains;
after performing the scanning, finding the first process or the second process having a specific attribute; and
when the first process or the second process having the specific attribute is found, controlling the first process and the second process to share a common domain.

8. An electronic device, comprising:
a storage device;
a physical memory; and
a processor, wherein the processor is configured to:
   divide the physical memory into a plurality of regions each having a plurality of memory pages, wherein a particular region of the plurality of regions includes at least three free memory pages, and wherein at least two free memory pages are consecutive memory pages;
   allocate a first free memory page of the particular region to a first process of an operating system of the electronic device when a memory allocation request is received from the first process;
   group a subset of the plurality of regions based on a specific characteristic, wherein the specific characteristic is an attribute not generated or terminated by a life cycle of the first process, and wherein the subset of the plurality of regions excludes the particular region; and
   configure the grouped subset as a domain;
   allocate a second free memory page of the particular region to a second process of the operating system of the electronic device when a memory allocation request is received from the second process;
   determine whether the first process and the second process both include the attribute;
   when the first process and the second process both include the attribute, make the second free memory page of the particular region allocated to the second process enter the domain; and
   when the first process or the second process do not include the attribute, configure the second free memory page of the particular region allocated to the second process as a new domain, wherein when the first process is terminated the first and second free memory pages are simultaneously deallocated.

9. The electronic device of claim 8, wherein the processor is further configured to:
divide the at least two consecutive free memory pages into at least one movable page and at least one unmovable page; and
manage the divided pages.

10. The electronic device of claim 8, wherein the processor is configured to:
receive another memory allocation request of the first process;
determine whether the second free memory page of the particular region allocated to the second process is present in the domain;
when the second free memory page of the particular region allocated to the second process is present in the domain, determine whether a size of the second free memory page of the particular region allocated to the second process is larger than a memory size of the first process requesting the another memory allocation; and
when the size of the second free memory page of the particular region allocated to the second process is larger than the memory size of the first process requesting the another memory allocation, allocate a third free memory page of the particular region to the first process.

11. The electronic device, of claim 10, wherein when the second free memory page of the particular region allocated to the second process is not present in the domain, or the size of the second free memory page of the particular region allocated to the second process is smaller than or equal to the memory size of the first process requesting the another memory allocation, the processor is further configured to allocate the third free memory page of the particular region to the first process, and make the third free memory page enter the domain.

12. The electronic device of claim 8, wherein the processor is further configured to:
terminate the first process and the second process; and
in response to terminating the first process and the second process, deallocate the memory pages of the first process and the second process and return the domain.

13. The electronic device of claim 8, wherein when the processor receives a request for performance of a compaction, the processor is further configured to:

perform the compaction, wherein the compaction includes scanning the domain and migrating a found free memory page from the domain;

after performing the compaction, determine whether only the domain without the found free memory page is present in the electronic device; and when only the domain without the found free memory page is present in the electronic device, return the domain.

14. The electronic device of claim 8, wherein the processor is further configured to:

scanning the first process and the second process, wherein the first process and the second process have different domains;

after performing the scanning, find the first process or the second process having a specific attribute; and when the first process or the second process having the specific attribute is found, control the first process and the second process to share a common domain.

* * * * *